United States Patent
Ye et al.

(10) Patent No.: US 12,003,884 B2
(45) Date of Patent: Jun. 4, 2024

(54) VIDEO PROCESSING METHOD AND APPARATUS, DEVICE, STORAGE MEDIUM AND COMPUTER PROGRAM PRODUCT

(71) Applicant: Beijing Zitiao Network Technology Co., Ltd., Beijing (CN)

(72) Inventors: Xinjing Ye, Beijing (CN); Linlin Wang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/147,940

(22) Filed: Dec. 29, 2022

(65) Prior Publication Data
US 2023/0133163 A1 May 4, 2023

Related U.S. Application Data

(63) Continuation of application No. PCT/CN2021/138507, filed on Dec. 15, 2021.

(30) Foreign Application Priority Data

Dec. 18, 2020 (CN) .......................... 202011508607.2

(51) Int. Cl.
*H04N 5/783* (2006.01)
*G06V 20/40* (2022.01)
(Continued)

(52) U.S. Cl.
CPC ............ *H04N 5/783* (2013.01); *G06V 20/49* (2022.01); *G11B 20/10527* (2013.01); *G11B 27/031* (2013.01)

(58) Field of Classification Search
CPC ............... H04N 5/783; H04N 21/2387; H04N 21/6587; G06V 20/49; G11B 20/10527;
(Continued)

(56) References Cited

U.S. PATENT DOCUMENTS

2012/0011552 A1  1/2012  Yao
2013/0279810 A1* 10/2013  Li .......................... G06V 20/42
                                                            382/195
(Continued)

FOREIGN PATENT DOCUMENTS

CN        107396019 A    11/2017
CN        108184165 A     6/2018
(Continued)

OTHER PUBLICATIONS

China National Intellectual Property Administration, Notice of Allowance Issued in Application No. 202011508607.2, dated Apr. 26, 2022, 4 pages.
(Continued)

*Primary Examiner* — Thai Q Tran
*Assistant Examiner* — Nienru Yang
(74) *Attorney, Agent, or Firm* — Alleman Hall & Tuttle LLP

(57) ABSTRACT

Embodiments of the present disclosure provide a video processing method and apparatus, a device, a storage medium and a computer program product, where the method includes: playing an audio in a process of capturing a video; playing a first part of the audio at a changing speed according to a first speed change mode in response to recognizing that a target object presents a target state in a captured video image; obtaining a target video according to the captured video image and the audio; and playing, in the target video, a video image captured before the target object presents the target state at a constant speed, and playing, in the target video, a video image captured after the target object presents the target state at a changing speed according to a second speed change mode, where the audio is played at a constant speed.

20 Claims, 7 Drawing Sheets

(51) Int. Cl.
*G11B 20/10* (2006.01)
*G11B 27/031* (2006.01)

(58) Field of Classification Search
CPC ............... G11B 27/031; G11B 27/005; G11B 2020/10981; G11B 2020/1099
USPC ........................................................ 386/343
See application file for complete search history.

(56) References Cited

U.S. PATENT DOCUMENTS

| | | |
|---|---|---|
| 2018/0035075 A1 | 2/2018 | Lee et al. |
| 2018/0198984 A1 | 7/2018 | Palma et al. |
| 2019/0018641 A1* | 1/2019 | Tawada ................. G11B 27/10 |
| 2019/0265875 A1* | 8/2019 | Park .................... G06F 3/04847 |

FOREIGN PATENT DOCUMENTS

| | | | |
|---|---|---|---|
| CN | 108271432 A | 7/2018 | |
| CN | 108401124 A | 8/2018 | |
| CN | 108616696 A | 10/2018 | |
| CN | 109376266 A | 2/2019 | |
| CN | 109862193 A | 6/2019 | |
| CN | 110086905 A | 8/2019 | |
| CN | 110337009 A | 10/2019 | |
| CN | 110892731 A | 3/2020 | |
| CN | 111722775 A | 9/2020 | |
| CN | 112422863 A | 2/2021 | |
| CN | 112653920 A | 4/2021 | |
| CN | 113067994 A | 7/2021 | |
| EP | 3764632 A1 * | 1/2021 | ............. G11B 27/34 |
| WO | 0113641 A1 | 2/2001 | |
| WO | 2016177296 A1 | 11/2016 | |
| WO | 2018085982 A1 | 5/2018 | |
| WO | 2018149175 A1 | 8/2018 | |
| WO | 2020015333 A1 | 1/2020 | |
| WO | 2020078026 A1 | 4/2020 | |
| WO | 2020172826 A1 | 9/2020 | |

OTHER PUBLICATIONS

China National Intellectual Property Administration, Office Action and Search Report Issued in Application No. 202011508607.2, dated Feb. 9, 2022, 12 pages.
ISA China National Intellectual Property Administration, International Search Report Issued in Application No. PCT/CN2021/138507, dated Feb. 24, 2022, WIPO, 17 pages.
European Patent Office, Extended European Search Report Issued in Application No. 21905765.0, Jan. 30, 2024, Germany, 9 pages.

* cited by examiner

VIDEO PROCESSING METHOD AND APPARATUS, DEVICE, STORAGE MEDIUM AND COMPUTER PROGRAM PRODUCT

CROSS-REFERENCE TO RELATED APPLICATIONS

This application is a continuation of International Application No. PCT/CN2021/138507, filed on Dec. 15, 2021, which claims a priority of Chinese Patent Application No. 202011508607.2, filed on Dec. 18, 2020, and entitled "Video Processing Method and Apparatus, Device, Storage Medium and Computer Program Product". Both of the aforementioned patent applications are incorporated herein by reference in their entireties.

TECHNICAL FIELD

Embodiments of the present disclosure relate to the technical field of computers, and in particular, to a video processing method and apparatus, a device, a storage medium and a computer program product.

BACKGROUND

A video recording function is a common function of a video camera or a video recording application of a client. With the development of technology, an application of the video recording function is becoming more and more widespread.

At present, the video recording function can make various kinds of videos, such as making slow-motion videos or fast-motion videos, etc. However, making various kinds of videos is based on that a section of a captured video is imported into a video editing software or an editing page for a corresponding slow playback process or a corresponding fast playback process, and then a slow-motion video playback or a fast-motion video playback is completed.

Therefore, the video speed change recording mode in the prior art has complicated operating steps and complicated processing procedures, and cannot provide convenient operation for a user, thus affecting the user experience.

SUMMARY

Embodiments of the present disclosure provide a video processing method and apparatus, a device, a storage medium and a computer program product, which are capable of providing a convenient operation for a user, and the processing procedure is simple, so as to meet the user requirements and improve the operation experience of the user.

In a first aspect, an embodiment of the present disclosure provides a video processing method, and the method includes:

playing an audio in a process of capturing a video;
playing a first part of the audio at a changing speed according to a first speed change mode in response to recognizing that a target object presents a target state in a captured video image; where the first part of the audio represents an unplayed part of the audio when it is recognized that the target object presents the target state in the captured video image;
obtaining a target video according to the captured video image and the audio;
playing, in the target video, a video image captured before the target object presents the target state at a constant speed, and playing, in the target video, a video image captured after the target object presents the target state at a changing speed according to a second speed change mode, where the audio is played at a constant speed; and
where a speed change direction of the first speed change mode is opposite from a speed change direction of the second speed change mode and a changing speed of the first speed change mode is the same as a changing speed of the second speed change mode.

In a second aspect, an embodiment of the present disclosure provides a video processing apparatus, and the apparatus includes:

a capturing module, configured to play an audio in a process of capturing a video;
a processing module, configured to play a first part of the audio at a changing speed according to a first speed change mode in response to recognizing that a target object presents a target state in a captured video image; where the first part of the audio represents an unplayed part of the audio when it is recognized that the target object presents the target state in the captured video image;
the processing module is further configured to obtain a target video according to the captured video image and the audio; and
a playing module, configured to play, in the target video, a video image captured before the target object presents the target state at a constant speed, and play, in the target video, a video image captured after the target object presents the target state at a changing speed according to a second speed change mode, where the audio is played at a constant speed; and
where a speed change direction of the first speed change mode is opposite from a speed change direction of the second speed change mode and a changing speed of the first speed change mode is the same as a changing speed of the second speed change mode.

In a third aspect, an embodiment of the present disclosure provides an electronic device, including:

at least one processor; and memory;
the memory stores computer-executed instructions; and
the at least one processor executes the computer-executed instructions stored in the memory to cause the at least one processor to execute the video processing method as described in the above first aspect.

In a fourth aspect, an embodiment of the present disclosure provides a computer readable storage medium storing computer-executed instructions which, when executed by a processor, implement the video processing method as described in the above first aspect.

In a fifth aspect, an embodiment of the present disclosure provides a computer program product including a computer program which, when executed by a processor, implements the video processing method as described in the above first aspect.

In a sixth aspect, an embodiment of the present disclosure provides a computer program which, when executed by a processor, implements the video processing method as described in the above first aspect.

The video processing method and apparatus, the device, the storage medium and the computer program product provided by the embodiments of the present disclosure allow for: playing an audio in a process of capturing a video, then playing a first part of the audio at a changing speed according to a first speed change mode in response to recognizing that a target object presents a target state in a captured video image, where the first part here represents an unplayed part of the audio when it is recognized that the target object presents the target state in the captured video image; then obtaining a target video according to the captured video image and the audio, playing, in the target video, a video image captured before the target object presents the target state at a constant speed, and playing, in the target video, a video image captured after the target object presents the target state at a changing speed according to a second speed change mode, where the audio is played at a constant speed, and where a speed change direction of the first speed change mode is opposite from a speed change direction of the second speed change mode and a changing speed of the first speed change mode is the same as a changing speed of the second speed change mode. Therefore, it is ensured that the audio is played at a constant speed in the target video, while a part of the video image is played at a constant speed and another part of the video image is played at a changing speed, thereby realizing the speed change recording and playing of the captured video. The present application can start the operation of controlling the video speed change recording directly by recognizing the target state presented by the target object, without the need to import the captured video into the video editing software or the editing page for a corresponding slow playback process or a fast playback process. In order to improve the user experience and make a user have a strong perception for the speed change recording, after the speed change recording is triggered in the video capturing process, the played audio is played at a changing speed according to the first speed change mode, while in the process of playing the target video generated after capturing, for the video captured after the speed change is triggered, the video image is played at a changing speed according to the second speed change mode, while the audio is played at a constant speed. Thus, the personalized needs of users are satisfied, and the processing procedure is simple and the operation steps are simplified, causing the user to realize the speed change processing of the video through convenient operation, thereby improving the user experience.

BRIEF DESCRIPTION OF THE DRAWINGS

In order to explain the embodiments of the present disclosure or the technical solutions in the prior art more clearly, the drawings that need to be used in the description of the embodiments or the prior art will be briefly introduced in the following. Obviously, the drawings in the following description are some embodiments of the present disclosure, and for those of ordinary skilled in the art, other drawings can be obtained according to these drawings without paying creative effort.

DESCRIPTION OF EMBODIMENTS

Figure 1:
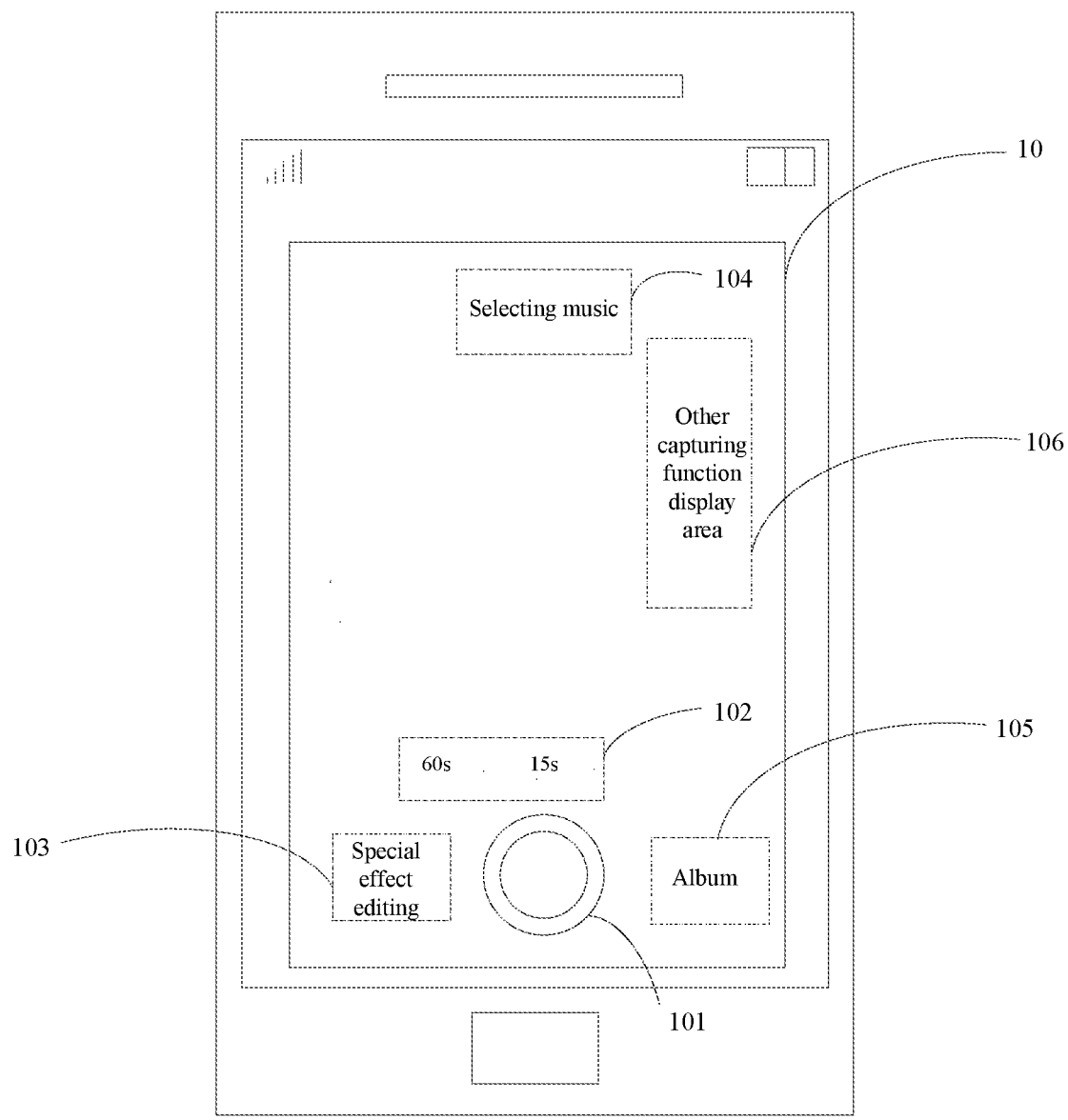
FIG. 1 is a schematic diagram of a capturing interface provided by an embodiment of the present disclosure.

Embodiments of the present disclosure will be described in greater detail below with reference to the drawings. Although some embodiments of the present disclosure are shown in the drawings, it should be understood that the present disclosure may be implemented in various forms and should not be construed as limited to the embodiments set forth herein. Rather, these embodiments are provided for a more thorough and complete understanding of the present disclosure. It should be understood that the drawings and embodiments of the present disclosure are for illustrative purposes only and are not intended to limit the scope of protection of the present disclosure.

It should be understood that steps described in the method implementations of the present disclosure can be executed in different orders or in parallel. In addition, the method implementations may include additional steps and/or omit the shown steps. The scope of the present disclosure is not limited in this respect.

As used herein, the term "include" and its variations are open-ended inclusion, i.e., "including but not limited to". The term "based on" means "based at least in part". The term "one embodiment" means "at least one embodiment"; the term "another embodiment" means "at least one other embodiment"; and the term "some embodiments" means "at least some embodiments". Relevant definitions of other terms will be given in the following description.

Note that the concepts "first", "second", etc., mentioned in the present disclosure are used only to distinguish between different apparatuses, modules or units, and are not intended to limit the order or interdependence of the functions performed by these apparatuses, modules or units.

It should be noted that the modifications of "one" and "more than one" mentioned in the present disclosure are illustrative but not restrictive, and it should be understood by those skilled in the art that, they should be understood as "one or more" unless otherwise clearly indicated in the context.

The names of messages or information interchanged between a plurality of apparatuses or modules in the embodiments of the present disclosure are for illustrative purposes only and are not intended to limit the scope of those messages or information.

At present, the video recording function can make various kinds of videos, such as making slow-motion videos or fast-motion videos, etc. However, making various kinds of videos is based on that a section of the captured video is imported into a video editing software or a corresponding slow playback process or a corresponding fast playback process is performed on an editing page, and then making a video is completed, thereby achieving a slow-motion video playback or a fast-motion video playback. In addition, in the prior art, there are platforms with fast and slow speed capturing functions, but the fast and slow speed herein is only processed and presented to a user in real time during capturing, and the requirements for real-time processing are difficult and the recording time is short, usually 1 s. Therefore, the video speed change recording mode in the prior art has complicated operating steps and complicated processing procedures, and cannot provide convenient operation for a user, thus affecting the user experience.

In order to solve the above problems, the technical concept of the present disclosure is that a speed change triggering operation can be configured, i.e., by recognizing the speed change triggering operation and an acquired second speed change mode for speed change recording, firstly, based on the second speed change mode, a first speed change mode matching the second speed change mode (i.e., a speed change direction of the first speed change mode is opposite from a speed change direction of the second speed change mode and a speed change speed of the first speed change mode is the same as a speed change speed of the second speed change mode) is acquired, then the video image captured after the target object recognized in the captured video image presents a target state is played at a changing speed according to the second speed change mode, which is used to prompt a user to start a speed change processing, and then a part of the video image in the target video generated by the video image and the audio is played at a constant speed and a part of the video image is played at the second speed change mode, while ensuring that the audio in the target video is played at a constant speed, thereby completing the speed change processing for the video. The processing procedure is simple and the operation steps are simplified, causing the user to realize speed change recording through convenient operations, thereby improving the user experience.

The technical solutions of the present disclosure will be explained in detail in the following specific embodiments. The following specific embodiments can be combined with each other, and the same or similar concepts or processes may not be repeated in some embodiments.

In practical applications, the execution subjects of the embodiments of the present disclosure may be a terminal device, such as a mobile terminal, a computer device (e.g., a desktop computer, a notebook computer, an all-in-one computer, etc.), and the mobile terminal may include a mobile device with a playing function, such as a smart phone, a handheld computer, a tablet computer, a wearable device with a display screen, etc. In practical applications, a displayed user interface, such as a capturing interface, can be used to capture or record a target object, where the target object can be a person, a scene, etc., and the playing interface can be used to play a target video, and the target video can be an audio and video processed by speed change recording, which is not specifically limited by the present disclosure.

In a scenario, referring to FIG. 1, FIG. 1 is a schematic diagram of a capturing interface provided by an embodiment of the present disclosure, where a terminal device can display a capturing interface 10 for capturing a target object, and the capturing interface 10 is provided with a capturing button 101, a capturing duration switching button 102, a special effect editing button 103, a selecting music button 104, and an album button 105, and may also include other capturing function display area 106. Where the capturing operation of the target object can be triggered by clicking the capturing button 101. Those skilled in the art should understand that the positions and the sizes of the capturing button 101, the capturing duration switching button 102, the special effect editing button 103, the selecting music button 104 and the other capturing function display area 106 can be set according to actual requirements. Where the capturing button 101 is configured to provide a capturing start function for a user; the capturing duration switching button 102 is configured to provide a capturing duration switching function for a user; the special effect editing button 103 is configured to provide a special effect for a user, where a default music can be contained in the special effect, the target state presented by a captured object (i.e., the target object) can be recognized through the special effect editing effect, so as to trigger a speed change processing operation; the selecting music button 104 can provide a music library for a user; and the album button 105 is configured to provide capturing materials for a user.

The video processing method according to the embodiments of the present disclosure can be applied to capturing or recording scenarios, which are specifically video speed change recording scenarios, for example, triggering any configured special effect editing effect is supported, where the special effect editing effect is used to support the function of controlling video speed change recording; and can recognize whether the target state is presented in the captured video image, if the target state is recognized during the capturing or recording procedure, i.e., the triggering operation for controlling video speed change recording is detected during the capturing or recording procedure, speed change processing, such as speed change processing for a video image or speed change playing for an audio during capturing, can be realized, without complicated operating steps. The present disclosure does not limit application scenarios.

The technical solutions of the present disclosure will be explained in detail in the following specific embodiments. The following specific embodiments can be combined with each other, and the same or similar concepts or processes may not be repeated in some embodiments. The terminal device can display a plurality of functions in the function display area in the capturing interface 10, such as a flip, a filter, a beautification, a countdown, a special effect editing effect, an album, selecting music, a capturing duration, etc., where the special effect editing effect herein can include a special effect editing effect used to support the control of video speed change recording function, such as a predefined sticker, in which the special effect can include the required speed change processing rate, recording at the required rate can realize speed change recording, and then the speed change mode (including speed change direction and speed change speed) configured by the special effect editing effect can be obtained by recognizing that the target object presents the target state; and selectable speed and speed change direction (fast or slow speed) for speed change processing can also be provided to a user through the capturing interface, and then the target state presented by the target object is recognized through the recognizable speed change trigger mode configured based on the speed change mode selected by the user in combination with the special effect in the special effect editing effect.

The special effect editing effect configured by the embodiments of the present disclosure can control speed change recording by recognizing trigger actions or specific objects. Take a sticker as an example, the sticker can be configured as follows: the sticker starts capturing and resets; for the sticker, recording is capable of being valid, but the preview is invalid; the corresponding speed change rate of the sticker is configured in the resource package; the speed change playing event and speed change rate should be transmitted to a video expression (VE) software development kit (SDK) and the client in real time; a speed change recording message interface is added, which requires the slowest control within 10 frames; upon making a sticker, speed up and add a frame properly, and slow down after entering the editing page to become normal speed, and if a slow down effect following the image is required, the normal speed of the sticker is feasible, and afterwards, particle effect, physical effect (cloth, feather, etc.) can only be slowed down; the speed change playing event and the speed change rate are transmitted to the VE and the client in real time, a new interface may be needed herein; where this sticker is forbidden to be duetted; the sticker does not record the original sound; and the sticker needs to disable a function of adjusting the rate, which are not limited by the present disclosure.

Specifically, for example, a captured object is taken as a character, and the special effect editing effect itself is configured with a speed change trigger special effect and a speed change mode (it can be that one special effect editing effect corresponds to one speed change trigger special effect, and one special effect corresponds to one speed change mode; it can also be that one special effect editing effect corresponds to a plurality of speed change trigger special effects, and one special effect corresponds to one speed change mode; it can also be that one special effect editing effect corresponds to a plurality of speed change trigger special effects, and a plurality of special effects correspond to one speed change mode; and it can also be that a plurality of special effect editing effects correspond to one speed change trigger special effect, one special effect corresponds to one speed change mode, etc., and there is a mapping relationship between a special effect and a speed change mode, which is not specifically limited herein), the character is displayed on the capturing interface 10. On the capturing interface 10, the user can select a capturing duration, such as 15 s shown in FIG. 1, which means that the current capturing interface allows the longest capturing duration of 15 s. The user clicks the special effect editing button 103 (see (a) of FIG. 2) to display the special effect editing effect display field 1031, including a plurality of stickers (see (b) of FIG. 2), selects a predefined sticker in the special effect editing effect, such as a sticker 1. And then the position of the special effect editing button is replaced with the sticker 1 (see (c) of FIG. 2), and the background image corresponding to the sticker 1 is displayed on the capturing interface. The user can also click the above other functions at the same time, for example, clicking the selecting music button 104 (see (a) of FIG. 3) to display the selecting music display interface 1041 (see (b) of FIG. 3), and the user can search the target music from the search field and confirm the use, such as music 1 (see (c) of FIG. 3).

Figure 2:
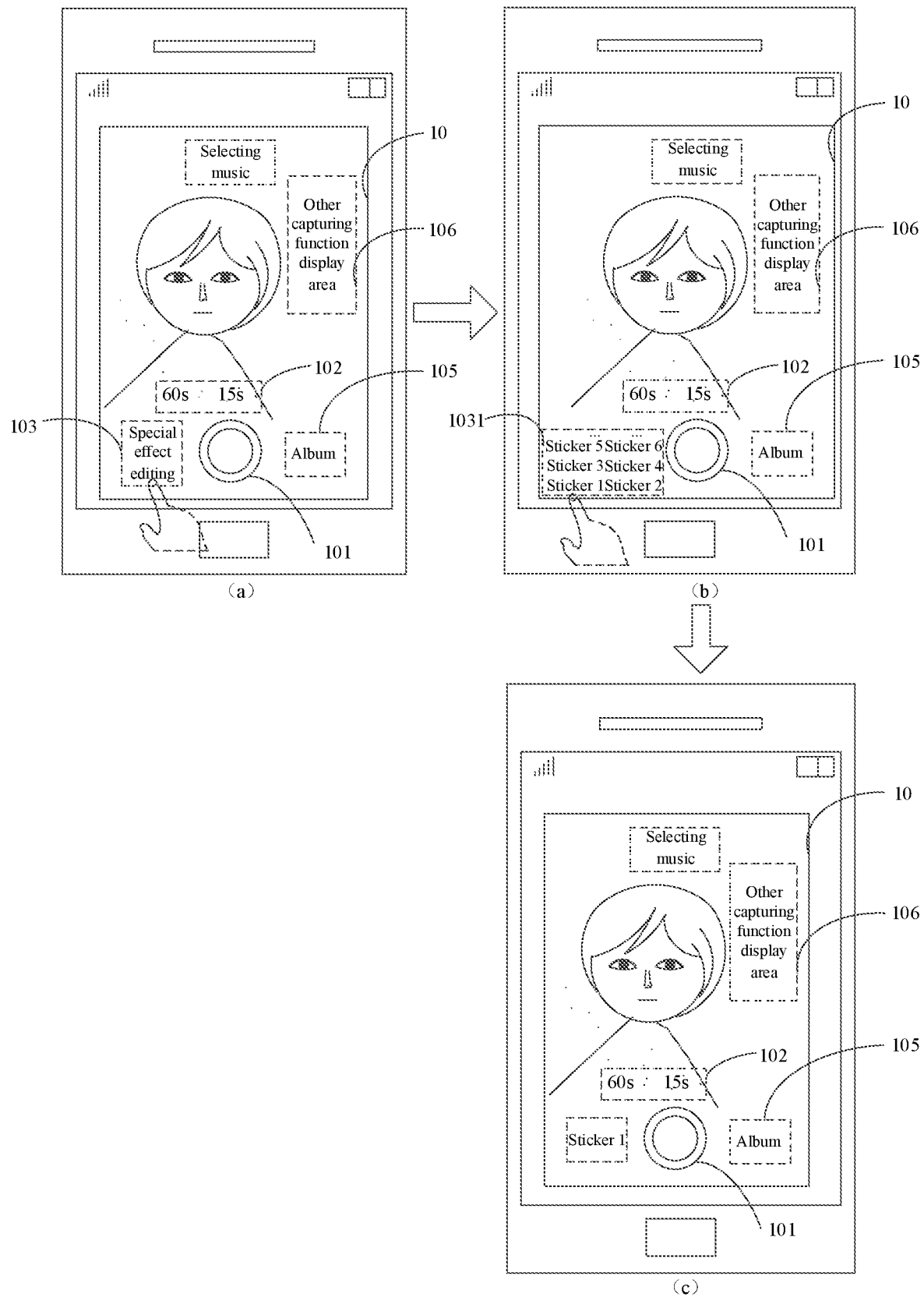
FIG. 2 is a schematic diagram of a scenario for a video processing method provided by an embodiment of the present disclosure.
Figure 3:
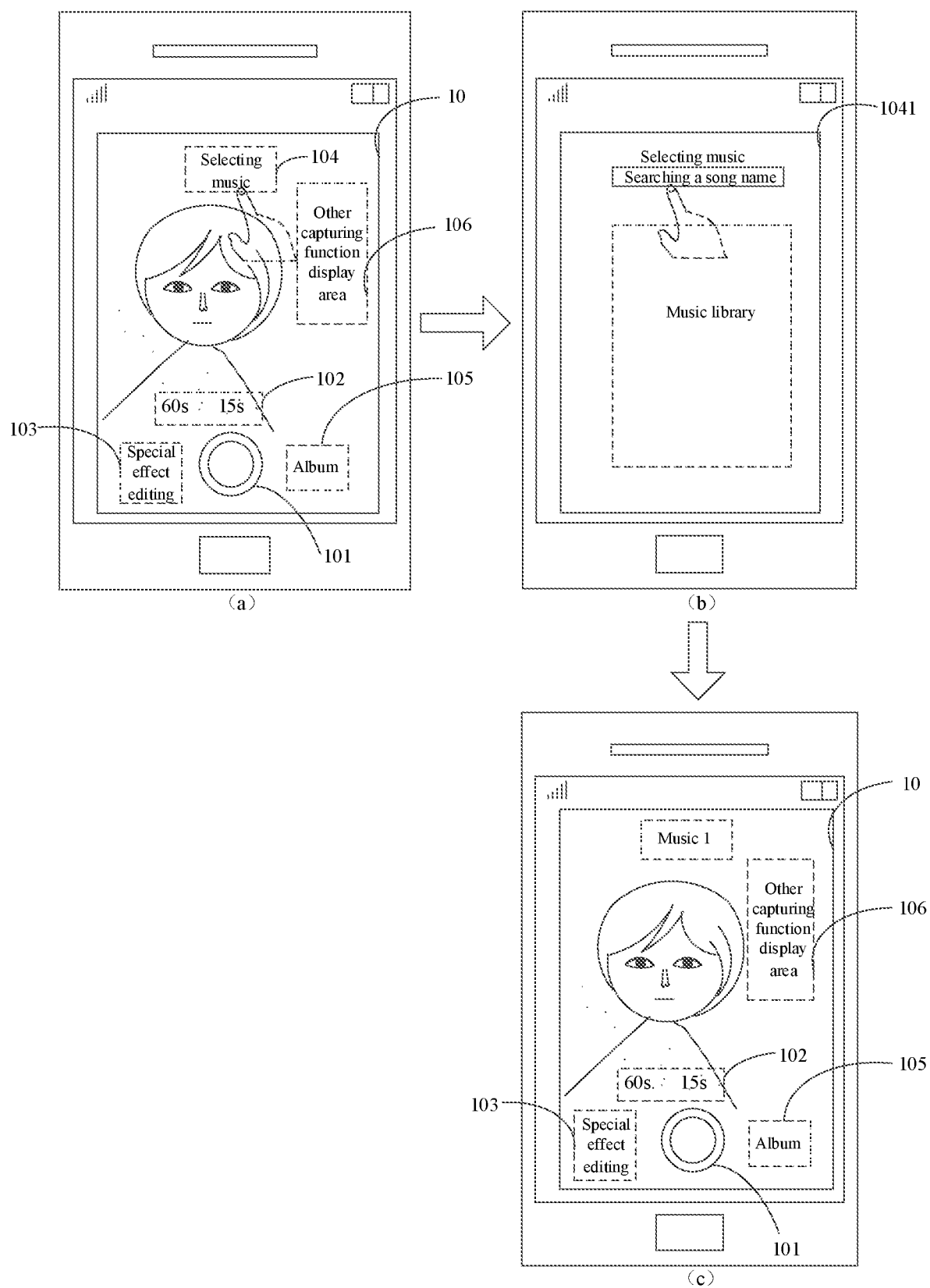
FIG. 3 is a schematic diagram of a scenario for a video processing method provided by another embodiment of the present disclosure.
Figure 4:
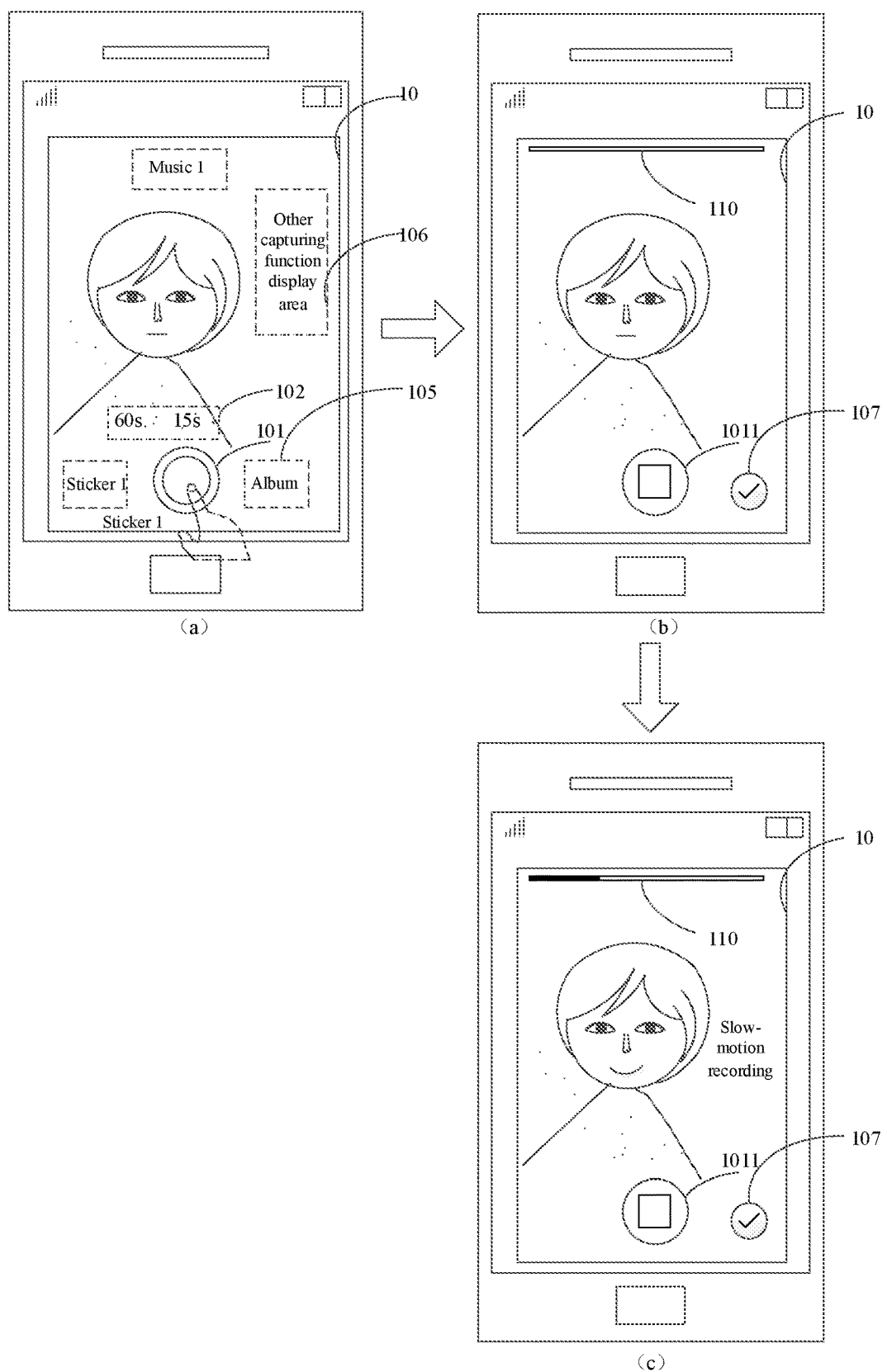
FIG. 4 is a flow chart of a video processing method provided by yet another embodiment of the present disclosure.

It should be noted that the operation sequence shown in (b) of FIG. 2 and (a) of FIG. 3 is not particularly limited. On the basis of (c) of FIG. 2 and (c) of FIG. 3, the user can turn on the capturing function by clicking the capturing button 101 in the capturing interface (see (a) of FIG. 4)). After the capturing function is turned on, the terminal device starts capturing the target object, and a progress bar 110 of capturing time and an ending capturing button 107 are displayed on the current capturing interface, and the functional modules are hidden. At the same time, the capturing button 101 is updated to the capturing state, i.e., the capturing button 101 is switched to a capturing pause button 1011 (see (v) of FIG. 4). When a special effect (such as a smile) is detected in the capturing procedure, the speed change recording function can be triggered (take slow recording as an example, see (c) of FIG. 4). In the capturing procedure, the video image is played at a constant speed, and at the same time, the audio is played at a rate opposite to that required by the special effect, and when the video is played after the capturing is complete, the captured video image after the acquired triggered speed change operation is played according to the speed change mode required by the characteristics, and the audio is played at a constant speed, thus ensuring that the audio played when the complete captured video is played is at a normal speed.

Take a special effect of the special effect editing effect as a smile as an example, if a smile action is detected in the capturing procedure, the operation for controlling video speed change recording is triggered, and the required speed change recording rate of the smile special effect (for example, 2× slow) is obtained, and at the same time, the audio triggered by the special effect will be processed and played in the background (here referred to as an audio and video terminal) at 2× fast. At this time, in order to ensure that the audio played during playing after recording is not interfered by the original sound played and/or randomly appeared before the speed change recording, captured original sound, such as ambient sound and played music original sound, is not recorded during the audio processing. It should be noted that, during the recording procedure, the speed change recording can be imperceptible to the user, and the video image and audio can be played at a normal speed, or in order to satisfy the user experience, for the speed change recording, the captured video image is played at a constant speed during the capturing procedure, and the unplayed part of the audio after the trigger speed change operation is turned on is played according to the second speed change mode that matches the first speed change mode required by the special effect. After the capturing is ended, the audio and video recorded before the special effect appears is played at a normal speed, and after the special effect triggering operation (i.e., speed change triggering operation) is detected, the video is played at a required rate of the special effect and the audio is played at a normal speed, so that the video speed change recording processing is realized, convenient operation is provided for a user, the processing procedure is simple, thus the user requirements are satisfied, and the operation experience of the user is improved.

The constant speed of video herein refers to the capturing speed, and the constant speed of audio refers to its own speed. Application scenarios are not limited by the present disclosure.

In addition, it should be understood by those skilled in the art that the "trigger" operation can include (but is not limited to): a click trigger, i.e., the user clicks the corresponding button or any position in the interface to realize the trigger; a gesture trigger, i.e., the user realizes a trigger operation by making a corresponding gesture; a voice trigger, i.e., the user realizes a triggering operation by issuing a corresponding voice instruction; an expression trigger, i.e., the user realizes a triggering operation by making a corresponding expression, etc., the present disclosure does not limit the triggering operation.

In an embodiment, the video processing method can be implemented in the following ways.

Figure 5:
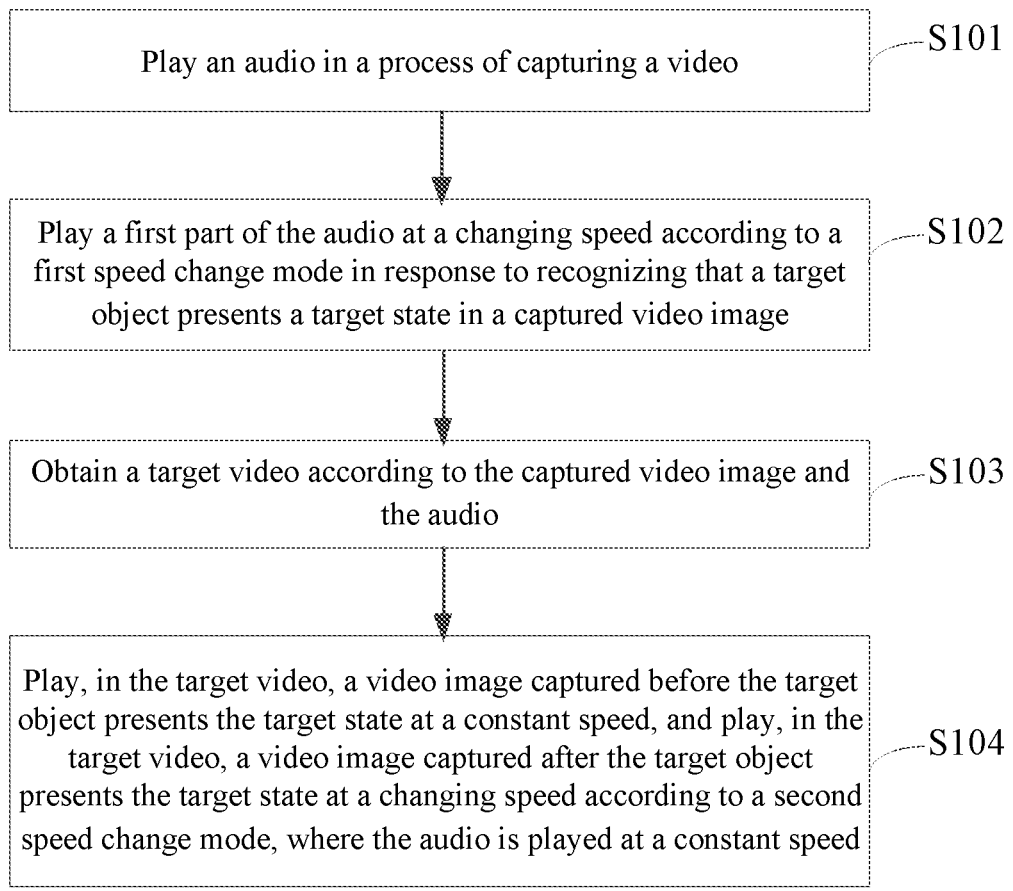
FIG. 5 is a flow chart of a video processing method provided by an embodiment of the present disclosure.

Referring to FIG. 5, FIG. 5 is a flow chart of a video processing method provided by an embodiment of the present disclosure. The video processing method can include the following.

S101: play an audio in a process of capturing a video.

S102: play a first part of the audio at a changing speed according to a first speed change mode in response to recognizing that a target object presents a target state in a captured video image; where the first part of the audio represents an unplayed part of the audio when it is recognized that the target object presents the target state in the captured video image.

The first speed change mode can be matched with the recognized target state. For example, if a smile triggers a speed change processing operation and the speed change mode is a 2× slow playback, the first speed change mode is 2× fast; and it can also be selected and input by the user before capturing the video, which is not specifically limited herein.

The method of the embodiments of the present disclosure can be applied to a terminal device, and the terminal device can display a capturing interface, which is a user interface for capturing a target object. The capturing interface includes a capturing area, a function display area and a capturing button, and a special effect editing effect module can be displayed in the function display area. By clicking the special effect editing button corresponding to the special effect editing module, a plurality of special effect editing effects can be displayed to the user in the capturing interface, where the plurality of special effect editing effects can include special effect editing effects for supporting video speed change recording function. Where the display modes of the plurality of special effect editing effects are not specifically limited.

Specifically, the user can start the capturing function by clicking the capturing button through the terminal device, and play a default audio or a special effect editing effect self-audio or an audio selected by the user in the process of capturing a video. In the capturing procedure, the terminal device detects whether there is an operation for controlling the video speed change processing in real time, i.e., recognizes whether the target object presents a target state, and if so, responds to the recognized target state. Firstly, when it is recognized that a target object presents a target state in a captured video image, a speed change mode of speed change playback required for the unplayed part of the audio, i.e., a first speed change mode, is obtained, where the first speed change mode can be a mode matched with a recording mode required by a special effect, for example, if the recording and playing mode required by the special effect is 2× slow playback, then the first speed change mode is 2× fast playback; and it can also be the mode of user input. The target state may include an interactive action and/or a preset object contained in the captured video, where the interactive action may include face and limb actions, such as smiling, blinking, raising a hand, lifting a leg, etc., and the recognized target objects are preset objects such as clothes, cars, buildings, etc., which are not limited by the present disclosure.

In practical applications, before the speed change trigger, the capturing interface needs to be displayed and the capturing function is turned on, before this, the user is required to select the special effect corresponding to a speed change recording, such as a special effect editing effect. Specifically, the terminal device can display the capturing interface and turn on the capturing function through the following steps:

Step a1: display the capturing interface for capturing the target object, where the capturing interface includes a special effect editing button for supporting and controlling video speed change recording.

Step a2: in response to a first triggering operation acting on the special effect editing button, upon receiving an instruction for instructing to perform a capturing operation on the capturing interface, perform a first capturing operation, and detect whether the target object presents the target state while capturing the target object in the capturing interface, where the target state includes a state in which the target object presents a target action and/or a preset object is presented in the target object.

Step a3: if it is recognized that the target object presents the target state in the video capturing procedure, execute an operation of controlling video speed change recording.

In the embodiments of the present disclosure, when a user capturing/recording a video (hereinafter referred to as the user) opens an application program, the terminal device can display a plurality of switching interfaces, and the user can click a switching button matching with the capturing interface to jump and display the capturing interface 10. Where the capturing interface can include a special effect editing button for supporting and controlling video speed change recording, which can specifically be a sticker, or it can also be that one sticker corresponds to turning on a recording function with one speed; it can also be that one sticker corresponds to recording functions with multiple speeds. Therefore, the recording function of the corresponding speed can be triggered according to the action of the target object or what the target object is. For example, smiling corresponds to 2× slow recording, waving corresponds to 2× fast recording, etc., or a special effect in a sticker can be used to trigger the speed change processing operation, and through selecting other special effect editing effects (such as a speed change mode special effect editing effect) before the video is captured, a user may perform a corresponding speed change processing in accordance with the acquired speed change mode input by the user upon recognizing the present target state during capturing, which is not limited by the present disclosure.

Taking the special effect in the special effect editing effect being configured with speed change mode as an example, where, in the capturing interface, before capturing is turned on, the user can click the special effect editing button to select the special effect editing effect used to support and control video speed change recording from the display area of the special effect editing effect, where, if there are multiple special effect editing effects used to support and control video speed change recording, the target special effect editing effect corresponding to the desired capturing speed can be selected from the special effect editing effect, and then the corresponding target triggering operation can be made based on the special effect in the special effect editing effect; and if the special effect editing effect used to support and control video speed change recording is one, the corresponding target triggering operation can be made based on the recognizable special effect in the special effect editing effect.

Specifically, after the user selects the special effect editing effect, the terminal device displays the background environment of the special effect editing effect on the capturing interface in response that the triggering operation acting on the special effect editing button, i.e., the first triggering operation. When the user clicks the capturing button to start capturing, an instruction for instructing to perform the capturing operation on the capturing interface is generated, and the terminal device receives the instruction and starts the capturing operation, i.e., the first capturing operation. In the capturing procedure, it is detected whether a target triggering operation (for example, an interactive action and/or a target object such as smiling, waving or a target building) exists in the captured video in real time. If existing, the client in the terminal device will send a speed change recording message corresponding to the target triggering operation to an audio and video terminal in the terminal device for speed change recording and saving of the current music.

S103: obtain a target video according to the captured video image and the audio.

S104: play, in the target video, a video image captured before the target object presents the target state at a constant speed, and play, in the target video, a video image captured after the target object presents the target state at a changing speed according to a second speed change mode, where the audio is played at a constant speed;

where a speed change direction of the first speed change mode is opposite from a speed change direction of the second speed change mode and a changing speed of the first speed change mode is the same as a changing speed of the second speed change mode.

In this embodiment, the captured video image and audio are synthesized to obtain the audio and video to be played, i.e., the target video. Then, after the capturing is complete, the terminal device plays the target video. In the process of playing the target video, the video image captured before the target object presents the target state is played at a constant speed and the video image captured after the target object presents the target state is played at a changing speed according to the second speed change mode, while the audio is played at a constant speed.

The constant speed of the video herein refers to the capturing speed, and the constant speed of the audio refers to its own speed. Here, the speed change direction the second speed change mode is opposite to the speed change direction of the first speed change mode. For example, if the first speed change mode is 2× slow, the second speed change mode is 2× fast. The purpose may be to play the music at a normal speed when the target video is played after the capturing is complete, so as to improve the user's viewing experience. In order to ensure that the audio played during playing after the capturing is complete is not interfered by the original sound played/or appeared randomly before the speed change recording, the captured original sound is not recorded during the audio processing.

In a possible design, the target state has a mapping relationship with the first speed change mode; or, the second speed change mode is determined in response to a setting operation of a user, and the first speed change mode is determined based on the second speed change mode.

In this embodiment, in view of the mapping relationship between the target state and the first speed change mode, it may be that the special effect editing effect itself defaults to the type and/or the speed of the speed change, therefore, the target state recognized by the special effect editing effect can determine its corresponding speed change type and/or speed. It is also possible to recognize a special effect through the special effect editing effect, and different actions in special effects trigger different types of speed changes, or even different speed changes, so as to determine the type and/or the speed of the speed change by the target state.

How to play an unplayed part of the audio at a changing speed according to a first speed change mode in response to recognizing that a target object presents a target state in a captured video image can be realized by the following steps.

Step b1: determine the first speed change mode having the mapping relationship with the target state in response to recognizing that the target object presents the target state in the captured video image.

Step b2: play the first part of the audio at a changing speed according to the first speed change mode.

In this embodiment, in response the recognized target state, the first speed change mode matching the target state is obtained through the mapping relationship, and then the first part of the audio is played at a changing speed based on the first speed change mode.

Since the second speed change mode is determined in response to a setting operation of a user, and the first speed change mode is determined based on the second speed change mode, the first speed change mode may be determined through the user by pushing a slider to set different speeds and selecting different types of speed changes through buttons. Here, there is no specific limitation on that how the user selects or sets different speed change modes, and the speed change mode includes a type of the speed change and/or a speed of the speed change.

Specifically, the second speed change mode can be a speed change mode required by the special effect, for example, if the speed change mode required by the special effect is 2× slow playback, the first speed change mode is 2× fast playback, and the second speed change mode is 2× slow playback; and can also be a mode input by the user. Specifically, after the capturing is complete, it jumps to display the playing interface, the video after speed change processing (i.e., the target video) is played through the playing interface, where the target video here includes a video image captured before the target object presents the target state and speed changing is performed, the video image captured after the target object presents the target state and played according to the second speed change mode and the audio played at a constant speed. Where the video image played according to the second speed change mode can be processed by adding or subtracting a frame.

In addition, when the capturing function is turned on, the terminal device starts capturing the target object and plays the currently captured video, where the played content here includes the video image upon capturing the target object and the music played in the capturing procedure. Until the speed change is triggered, the speed change processing starts, and the first part of the audio is played at a changing speed according to the first speed change mode, where the first part of the audio here represents an unplayed part of the audio when it is recognized that the target object presents the target state in the captured video image. Where the starting time of the first part of the audio is a time when the capturing interface captures the target object (i.e., a time when the speed change processing is started) in response to recognizing that the target object presents the target state in the captured video image; and the termination time of the first part of the audio is a time in response that the capturing is complete, which can be triggered by the user or a time of arrival of the capturing time. For example, when the start time of the first part of the audio is the capturing start time, it means that the target state is immediately detected when the capturing function is started, therefore, the video image played after the capturing is complete is a video image with speed change at the beginning.

Figure 6:
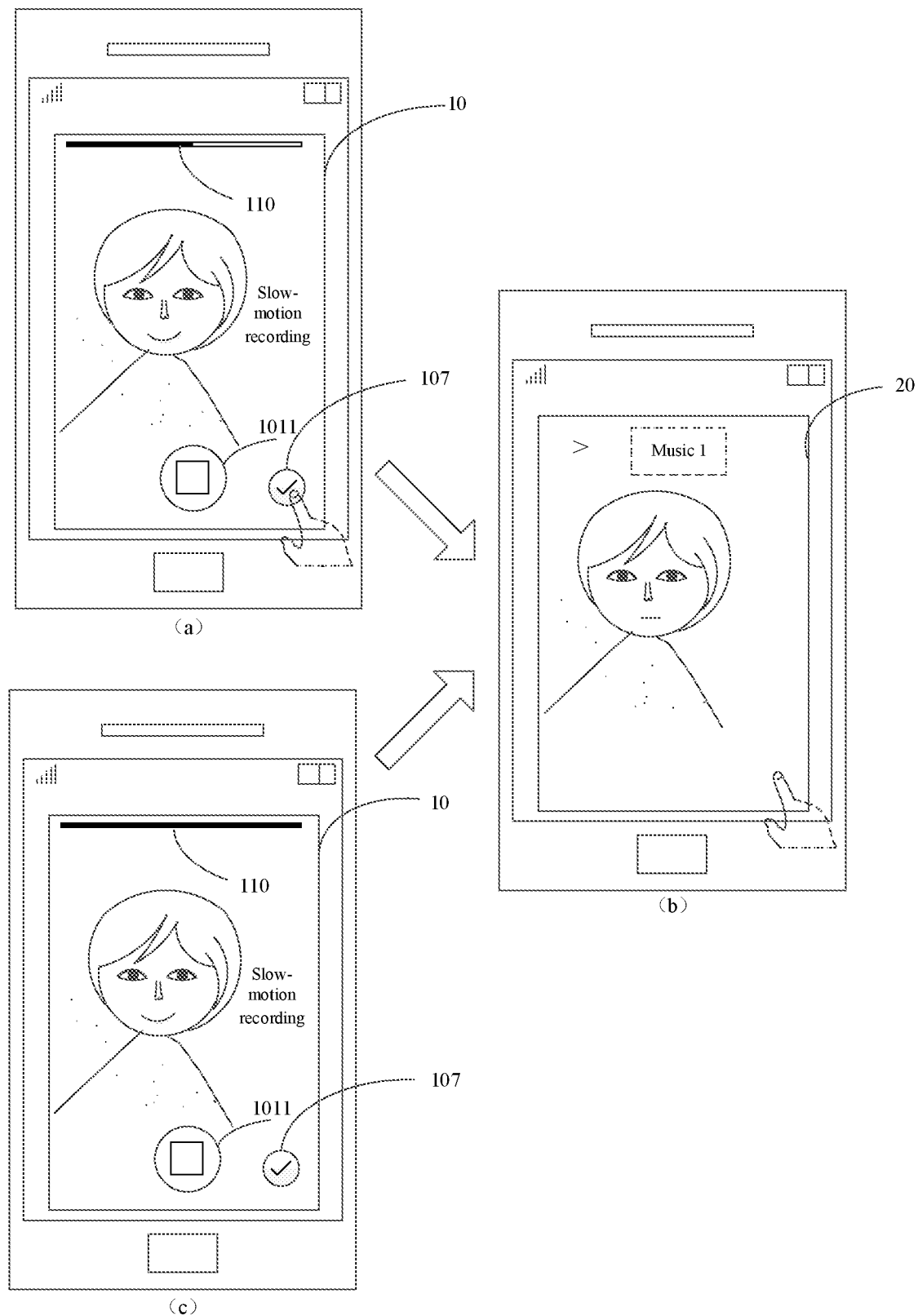
FIG. 6 is a schematic diagram of a scenario for a video processing method provided by a further embodiment of the present disclosure.

Please refer to FIG. 6 for how to display the playing interface, and FIG. 6 is a schematic diagram of a scenario for a video processing method provided by a further embodiment of the present disclosure. Before playing the target video, the method may further include:

jumping to display a playing interface in response to a second triggering operation for indicating to end capturing, where the playing interface is used to play the target video; or, jumping to display the playing interface after a capturing time in the capturing interface is over.

In the embodiments of the present disclosure, in the capturing procedure, the user can click an ending capturing button 107 (see (a) of FIG. 6), and in response to the click operation, i.e., the second triggering operation, the terminal device jumps from the capturing interface 10 to the playing interface 20 and displays the playing interface 20 (see (b) of FIG. 6). If the operation of the ending capturing button 107 triggered by the user is not detected in the capturing procedure, when the capturing time in the capturing interface is complete, for example, the capturing progress bar on the capturing interface reaches the ending position (see (c) of FIG. 6), it will automatically jump from the capturing interface 10 to the playing interface 20 and display the playing interface 20 (see (b) of FIG. 6). The present disclosure does not specifically limit the mode of switching and jumping between the capturing interface and the playing interface.

Taking the smile action as the target triggering operation (i.e. the target state), and the smiling action to represent a 2× slow recording triggering action as an example, the special effect editing effect corresponding to the smile action is first added, and the music can also be selected or the background music of the special effect editing effect corresponding to the smile action can be taken as the captured music, and the terminal device starts to detect the target triggering operation. Specifically, it is determined whether there is a smile action, if there is a smile action, it is determined whether the current smile action occurs in the capturing, if the current smile action occurs in the capturing, it is determined whether the speed change state is triggered, if so, a message corresponding to the rate required by the smile action, i.e., the message recorded at 2× slow speed, is sent to the audio and video terminal VE, and the VE perform a fast recording and saving on the default music (the music currently played on the capturing interface), the fast recording here can be recorded at 2× fast speed. At the same time, the original sound is not recorded, and then the recorded target audio is sent to the client, and the client plays the target audio at a 2× slow speed, which shortens the total time, and ends the recording and playing.

According to the present disclosure, the capturing speed can be controlled only by smiling at the camera without the user operating the screen. At the same time, there is no need to import the captured video into other editing pages or software, the processing procedure is simple, and the user experience is improved. It should be noted that smile recognition is taken as an example to clearly explain the triggering and processing procedure of speed change recording, but the present disclosure does not limit interactive behavior, including raising a hand, gagging, shaking one's head, etc.

The video processing method provided by the embodiments of the present disclosure allow for: playing an audio in a process of capturing a video, then playing a first part of the audio at a changing speed according to a first speed change mode in response to recognizing that a target object presents a target state in a captured video image, where the first part here represents an unplayed part of the audio when it is recognized that the target object presents the target state in the captured video image; then obtaining a target video according to the captured video image and the audio, playing, in the target video, a video image captured before the target object presents the target state at a constant speed, and playing, in the target video, a video image captured after the target object presents the target state at a changing speed according to a second speed change mode, where the audio is played at a constant speed, and where a speed change direction of the first speed change mode is opposite from a speed change direction of the second speed change mode and a changing speed of the first speed change mode is the same as a changing speed of the second speed change mode. Therefore, it is ensured that the audio is played at a constant speed in the target video, while a part of the video image is played at a constant speed and another part of the video image is played at a changing speed, thereby realizing the speed change recording and playing of the captured video. The present application can start the operation of controlling the video speed change recording directly by recognizing the target state presented by the target object, without the need to import the captured video into the video editing software or the editing page for a corresponding slow playback process or a fast playback process. In order to improve the user experience and make a user have a strong perception for the speed change recording, after the speed change recording is triggered in the video capturing process, the played audio is played at a changing speed according to the first speed change mode, while in the process of playing the target video generated after capturing, for the video captured after the speed change is triggered, the video image is played at a changing speed according to the second speed change mode, while the audio is played at a constant speed. Thus, the personalized needs of users are satisfied, and the processing procedure is simple and the operation steps are simplified, causing the user to realize the speed change processing of the video through convenient operation, thereby improving the user experience In an embodiment of the present disclosure, on the basis of the above embodiments, the target video can be obtained at least by the following two modes.

Mode 1: synthesize the video image after performing a speed change processing and the audio played at a constant speed as a target video.

Step c1: record the captured video image at a constant speed to obtain a first video.

Step c2: divide the first video into a first video segment and a second video segment; the first video segment represents a segment of the first video before the target object presents the target state; and the second video segment represents a segment of the second video after the target object presents the target state.

Step c3: perform speed change processing on the second video segment according to the second speed change mode to obtain a third video segment.

Step c4: synthesize the audio in a spliced video of the first video segment and the third video segment to obtain the target video.

In this embodiment, firstly, the captured video image is recorded at a constant speed to obtain the first video, and then the first video is divided into a segment (i.e., the first video segment) before the target object presents the target state and a segment (i.e., the second video segment) after the target object presents the target state. The first video segment is saved unchanged, and for the second video segment, the second video segment is processed by adding or subtracting a frame according to a second speed change mode, to obtain a third video segment, where the third video segment is a video image after speed change processing. Then the saved first video segment is spliced with the third video segment obtained by speed change processing to obtain a spliced video, and the audio recorded and saved at a normal speed is synthesized with the spliced video to obtain a target video. Since it is background processing, rather than real-time processing, the speed change processing that differs from speed change processing with the duration in prior art can be supported and the operation is simple without importing other editing software, thus improving the user experience.

Mode 2: splice the video image after speed change processing with the audio after speed change processing to generate the target video.

Step d1: record a played video image and a played audio to obtain a second video in the process of capturing a video; and in the second video, play the audio before the target object presents the target state at a constant speed, and play the audio after the target object presents the target state at a changing speed according to a first speed change mode, where the captured video image is played at a constant speed.

Step d2: divide the second video into a third video segment and a fourth video segment; where the third video segment represents a segment of the second video before the target object presents the target state; and the fourth video segment represents a segment of the second video after the target object presents the target state.

Step d3: perform speed change processing on the fourth video segment according to the second speed change mode to obtain a fifth video segment; and splice the third video segment and the fifth video segment to obtain the target video.

In this embodiment, in the process of capturing a video, the played video image and audio are recorded to obtain the second video, and the recorded audio before the target object presents the target state is played at a constant speed, the recorded audio after the target object presents the target state is played at a changing speed according to the first speed change mode, and the recorded video image is played at a constant speed. Where the second video is divided into a segment (i.e., the third video segment) before the target object presents the target state and a segment (i.e., the fourth video segment) after the target object presents the target state.

Specifically, the third video segment is saved, and speed change processing is performed on the fourth video segment according to second speed change mode, i.e., the image video in the fourth video segment is processed by adding or subtracting a frame, and the audio in the fourth video segment (i.e., the audio played at a changing speed based on first speed change mode and recorded) is played in a second speed change mode, such that the audio is played at a constant speed. Splice the saved third video segment with the speed change processed fifth video segment to obtain the target video. Since it is background processing, rather than real-time processing, the speed change processing that differs from speed change processing with the duration in prior art can be supported and the operation is simple without importing other editing software, thus improving the user experience.

In order to ensure the normal speed of the audio played through the first speed change mode, the second speed change mode with the opposite speed change direction and the same speed as those of the first speed change mode can be recorded first to obtain the audio processed by the first speed change mode. For example, if the first speed change is a 2× slow speed, the second speed change is a 2× fast speed. Then the audio processed by the first speed change mode is subjected to speed change processing according to the second speed change mode to obtain the audio played at normal speed, i.e., the audio played in the target video.

Specifically, the terminal device acquires the currently played target music when the speed change recording is triggered in the capturing process, and then performs speed change recording on the audio after presenting the target state according to the determined second speed change mode, so as to generate the speed change audio which does not contain the original sound upon capturing in the capturing interface.

The starting time of the audio recorded by the first speed change mode is a time when the target state is presented in response to the recognition (i.e., a time when the target state is presented in response to the recognized target object); and the ending time of the audio recorded by the first speed change mode is a time corresponding to the progress of playing music when the capturing interface captures the target object at the end of capturing (i.e., a time when the speed change recording is complete).

The rate of the speed change includes slow speed, fast speed and normal speed, and the speed is any value between 0.333-3, and the speed change can be represented by speed multiplying power. Exemplarily, taking the first speed change as 2× slow speed as an example, for example, the video image recorded at the normal speed is 30 frames/s, according to the rate of the 2× slow speed, the corresponding subtracted frame operation is carried out on the video image, for example, the recorded video image is recorded at 2 s for 30 frames, so that the playing rate of each frame of video image becomes slower upon playing.

In an embodiment of the present disclosure, based on the above embodiments, after the capturing function is turned on, the video processing method may further include:

in response to the second triggering operation for instructing to end capturing, resetting at least one of the following: the first speed change mode, the second speed change mode, a state of special effect editing effect, and a state of the capturing interface.

In the embodiments of the present disclosure, the user can click an ending button used to indicate the end of capturing in the capturing interface. When the terminal device detects the triggering operation acting on the end button, i.e., the second triggering operation, in response to the second triggering operation, the terminal device sends a message of resetting the recording speed, controls the VE to reset state and the client to reset state, and then updates the capturing state. Specifically, the first speed change mode and/or the second speed change mode and/or the state of the special effect editing effect and/or the state of the capturing interface are reset.

Specifically, the specific procedure of the user clicking start capturing/stop special effect editing effect is as follows: the terminal device first judges whether the capturing is started, if the capturing is started, updates the capturing state and end the started capturing state; and if the capturing is not started, judges whether the capturing is ended. If the capturing is ended, a message resetting the recording speed is sent to control the VE to reset state and the client to reset state, so as to update the capturing state and end the capturing state.

In an embodiment of the present disclosure, based on the above embodiments, the video processing method is explained in detail. After jumping to display the playing interface, the video processing method can also be realized by the following steps.

Step e1: control the playing interface to return to the capturing interface containing a captured target object in response to a first return triggering operation.

Step e2: if an instruction to indicate a recapture is received, reset the content of the capturing interface containing the captured target object and exit the capturing interface according to the instructions for indicating a recapture.

In the embodiments of the present disclosure, after jumping to display the playing interface, the recorded video, i.e., the target video, is played on the display interface. When the user wants to return to the capturing interface for re-editing, re-capturing or continuous capturing, the user can click the first return button on the display interface, in response to the first return triggering operation acting on the first return button, the terminal device controls the playing interface to return to the capturing interface containing the captured target object, i.e., jumps to display the capturing interface in a pause capturing state. The user can choose to cancel the current capturing content in the current capturing interface, i.e., the user can click the second back button on the current capturing interface, generate an instruction for re-capturing, and send the instruction to the terminal device, the terminal device receives the instruction, resets the content of the capturing interface and exits the current capturing interface according to the instruction. It is convenient for the user to re-capture, and the interactive operation is simple.

In an embodiment of the present disclosure, based on the above embodiments, the video processing method is explained in detail. The video processing method may further include the following steps.

Step f1: after controlling the playing interface to return to the capturing interface containing a captured target object or when the capturing interface receives an instruction to suspend capturing upon capturing the target object in the capturing interface, detect whether to the progress bar of capturing time on the current capturing interface reaches the ending position.

Step f2: if the ending position is not reached, when an instruction for instructing to perform the capturing operation on the capturing interface is received, control to continue performing the capturing operation on the capturing interface.

In the embodiments of the present disclosure, if the capturing time in the capturing interface is not over yet, the user can continue capturing in the current capturing interface immediately after the original capturing content. It can be realized by at least two scenarios as follows.

Scenario 1: the current interface is in the playing interface, and the user can click the first return button in the playing interface to make the terminal device to return the playing interface to the capturing interface in the pause capturing state. In this state, the progress bar of the capturing time is displayed on the capturing interface, and whether capturing can be continued is determined by detecting whether the progress bar of the capturing time on the capturing interface reaches the ending position. If the ending position is not reached, the user can click the capturing button on the capturing interface in this state, and the terminal device receives an instruction for instructing to perform capturing operation on the capturing interface, and continues performing the capturing operation on the capturing interface according to the instruction.

Scenario 2: the current interface is in the capturing interface, and the capturing interface is in the capturing pause state in response to the instruction input by the user to indicate a capturing pause. In this state, the progress bar of the capturing time is displayed on the capturing interface, and whether capturing can be continued is determined by detecting whether the progress bar of the capturing time on the capturing interface, in this state, reaches the ending position. If the ending position is not reached, the user can click the capturing button on the capturing interface in this state, and the terminal device receives an instruction for instructing to perform capturing operation on the capturing interface, and continues performing capturing operation on the capturing interface according to the instruction.

Thus, the present disclosure aims to reduce the threshold for the user to capture a "slow-motion transformation" class of video, to cause the user to record the slow-motion video more than 1 s or record fast motion through special effect editing effect, and solve the problem of a music and image mismatch, meanwhile in a special effect package, a logic to "recognize a certain triggering condition, and allow the recording to change a speed" is added, and the speed change playing event is passed to the audio and video terminal and the client in real time by the special effect to perform speed change recording in the audio and video terminal, enabling the user to more simply produce a higher quality slow-motion video or a higher quality fast-motion video, thus improving the user experience.

Figure 7:
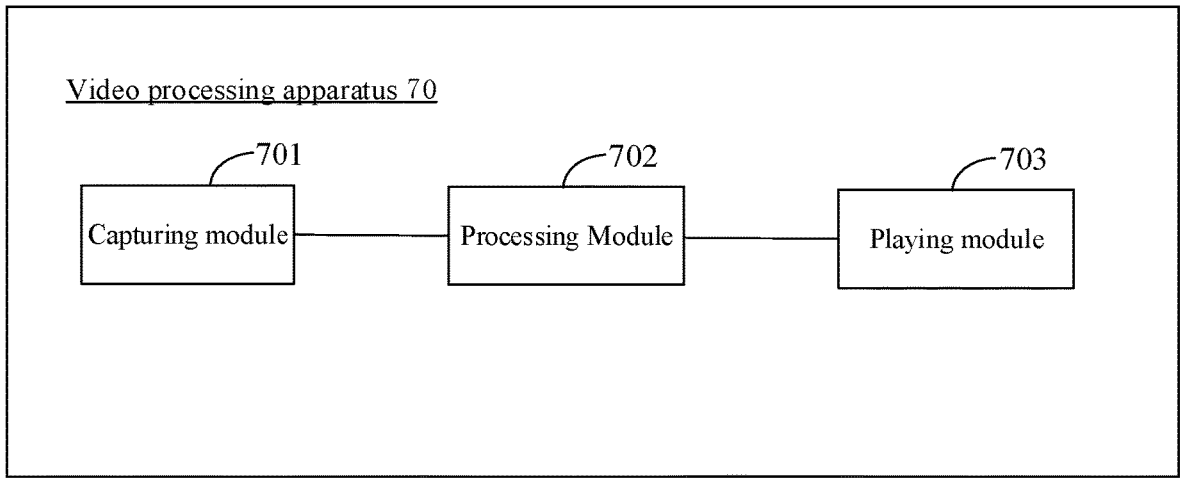
FIG. 7 is a structural block diagram of a video processing apparatus provided by an embodiment of the present disclosure.

FIG. 7 is a structural block diagram of a video processing apparatus provided by an embodiment of the present disclosure, corresponding to the video processing method of the embodiment disclosed above. Where the video processing apparatus can be a terminal device. For the convenience of explanation, only parts related to the embodiment of the present disclosure are shown. Referring to FIG. 7, the video processing apparatus 70 may include: a capturing module 701, a processing module 702 and a playing module 703. The capturing module 701 is configured to play an audio in a process of capturing a video; the processing module 702 is configured to play a first part of the audio at a changing speed according to a first speed change mode in response to recognizing that a target object presents a target state in a captured video image; where the first part of the audio represents an unplayed part of the audio when it is recognized that the target object presents the target state in the captured video image; the processing module 702 is further configured to obtain a target video according to the captured video image and the audio; and the playing module 703 is configured to play, in the target video, a video image captured before the target object presents the target state at a constant speed, and play, in the target video, a video image captured after the target object presents the target state at a changing speed according to a second speed change mode, where the audio is played at a constant speed; and where a speed change direction of the first speed change mode is opposite from a speed change direction of the second speed change mode and a changing speed of the first speed change mode is the same as a changing speed of the second speed change mode.

The capturing module 701, the processing module 702, and the playing module 703 provided by the embodiments of the present disclosure play the video in the process of capturing a video, then play a first part of the audio at a changing speed according to a first speed change mode in response to recognizing that a target object presents a target state in a captured video image, where the first part here represents an unplayed part of the audio when it is recognized that the target object presents the target state in the captured video image; then obtain a target video according to the captured video image and the audio, play, in the target video, a video image captured before the target object presents the target state at a constant speed, and play, in the target video, a video image captured after the target object presents the target state at a changing speed according to a second speed change mode, where the audio is played at a constant speed, and where a speed change direction of the first speed change mode is opposite from a speed change direction of the second speed change mode and a changing speed of the first speed change mode is the same as a changing speed of the second speed change mode. Therefore, it is ensured that the audio is played at a constant speed in the target video, while a part of the video image is played at a constant speed and another part of the video image is played at a changing speed, thereby realizing the speed change recording and playing of the captured video. The present application can start the operation of controlling the video speed change recording directly by recognizing the target state presented by the target object, without the need to import the captured video into the video editing software or the editing page for a corresponding slow playback process or a fast playback process. In order to improve the user experience and make a user have a strong perception for the speed change recording, after the speed change recording is triggered in the video capturing process, the played audio is played at a changing speed according to the first speed change mode, while in the process of playing the target video generated after capturing, for the video captured after the speed change is triggered, the video image is played at a changing speed according to the second speed change mode, while the audio is played at a constant speed. Thus, the personalized needs of users are satisfied, and the processing procedure is simple and the operation steps are simplified, causing the user to realize the speed change processing of the video through convenient operation, thereby improving the user experience.

The apparatus provided by the embodiment of the present disclosure can be used to perform the technical solution of the video processing method embodiment described in the first aspect above, and their implementation principles and technical effects are similar, and the embodiment of the present disclosure will not be repeated here.

In an embodiment of the present disclosure, the embodiment of the present disclosure describes the video processing apparatus in detail on the basis of the above disclosed embodiments. Where the target state has a mapping relationship with the first speed change mode; the processing module 702 is specifically configured to: determine the first speed change mode having the mapping relationship with the target state in response to recognizing that the target object presents the target state in the captured video image; and play the first part of the audio at a changing speed according to the first speed change mode.

In an embodiment of the present disclosure, the target state includes a state in which the target object presents a target action and/or a preset object is presented in the target object.

In an embodiment of the present disclosure, the processing module 702 is specifically configured to: record the captured video image at a constant speed to obtain a first video; divide the first video into a first video segment and a second video segment; the first video segment represents a segment of the first video before the target object presents the target state; and the second video segment represents a segment of the second video after the target object presents the target state; perform speed change processing on the second video segment according to the second speed change mode to obtain a third video segment; and synthesize the audio in a spliced video of the first video segment and the third video segment to obtain the target video.

In an embodiment of the present disclosure, the processing module 702 is further specifically configured to: record a played video image and a played audio to obtain a second video in the process of capturing a video; and in the second video, play the audio before the target object presents the target state at a constant speed, and play the audio after the target object presents the target state at a changing speed according to a first speed change mode, where the captured video image is played at a constant speed; divide the second video into a third video segment and a fourth video segment; where the third video segment represents a segment of the second video before the target object presents the target state; and the fourth video segment represents a segment of the second video after the target object presents the target state; and perform speed change processing on the fourth video segment according to the second speed change mode to obtain a fifth video segment; and splice the third video segment and the fifth video segment to obtain the target video.

In an embodiment of the present disclosure, the second speed change mode is determined in response to a setting operation of a user, and the first speed change mode is determined based on the second speed change mode.

In an embodiment of the present disclosure, the processing module 702 is further configured to: in response to the second triggering operation for instructing to end capturing, reset at least one of the following: the first speed change mode, the second speed change mode, a state of special effect editing effect, and a state of the capturing interface.

In an embodiment of the present disclosure, the playing module 703 is further configured to: before playing the target video, jump to display a playing interface in response to a second triggering operation for indicating to end capturing, where the playing interface is configured to play the target video.

In an embodiment of the present disclosure, the processing module 702 is further configured to: after the jumping to display the playing interface, control the playing interface to return to the capturing interface containing a captured target object in response to a first return triggering operation; and when an instruction to indicate a recapture is received, reset the content of the capturing interface containing the captured target object and exit the capturing interface according to the instructions for indicating a recapture.

In an embodiment of the present disclosure, the processing module 702 is further configured to: after controlling the playing interface to return to the capturing interface containing a captured target object or when the capturing interface receives an instruction to suspend capturing upon capturing the target object in the capturing interface, detect whether to the progress bar of capturing time on the current capturing interface reaches the ending position; and if the ending position is not reached, when an instruction for instructing to perform the capturing operation on the capturing interface is received, control to continue perform the capturing operation on the capturing interface.

In an embodiment of the present disclosure, the playing module 703 is further configured to: before playing the target video, jump to display the playing interface after a capturing time in the capturing interface is over.

The above modules can be implemented as software components executed on one or more general-purpose processors, or as hardware, such as programmable logic devices and/or application-specific integrated circuits, that perform certain functions or their combinations. In some embodiments, these modules can be embodied in the form of software products, which can be stored in non-volatile storage media, including those that enable computer devices (such as personal computers, servers, network devices, mobile terminals, etc.) to implement the methods described in the embodiments of the present invention. In an embodiment, the above modules can also be implemented on a single device or distributed on multiple devices. The functions of these modules can be combined with each other or further split into multiple sub-modules.

A person skilled in the art can clearly understand that for the convenience and brevity of the description, specific working processes of a video processing apparatus described above can refer to the corresponding processes in the foregoing method embodiments, and details are not described herein again.

Based on the same inventive concept as the method, an embodiment of the present application further provides an electronic device, including a processor and a memory; the memory is configured to store a program for executing the methods described in the above-mentioned various method embodiments; and the processor is configured to execute the program stored in the memory.

The electronic device can be a terminal device. The electronic device includes a processor and a memory; the memory is configured to store a program for executing the methods described in the above-mentioned various method embodiments; the processor is configured to execute the program stored in the memory. The processor may be a processing unit including a central processing unit (CPU) or other forms with data processing capability and/or instruction execution capability, and may control other components in the electronic device to perform desired functions. The memory may include one or more computer program products, which may include various forms of computer readable storage media, such as volatile memories and/or nonvolatile memories. The volatile memories may include, for example, a random access memory (RAM) and/or a cache. The nonvolatile memories may include, for example, a read only memory (ROM), a hard disk, a flash memory, etc. One or more computer program instructions may be stored on the computer readable storage medium, and the processor may run the program instructions to realize the functions of the embodiments of the present disclosure described above and/or other desired functions.

The terminal device may include, but is not limited to: a mobile terminal such as a mobile phone, a notebook computer, a digital broadcast receivers, a personal digital assistant (PDA), a table person computer, a portable media player (PMP), and an on-vehicle terminal (e.g., an on-vehicle navigation terminal), a wearable electronic device, and a stationary terminal such as a digital TV and a desktop computer, etc. The electronic device shown in FIG. 8 is only an example, which should not bring any limitation to the function and the use range of the embodiments of the present disclosure.

Figure 8:
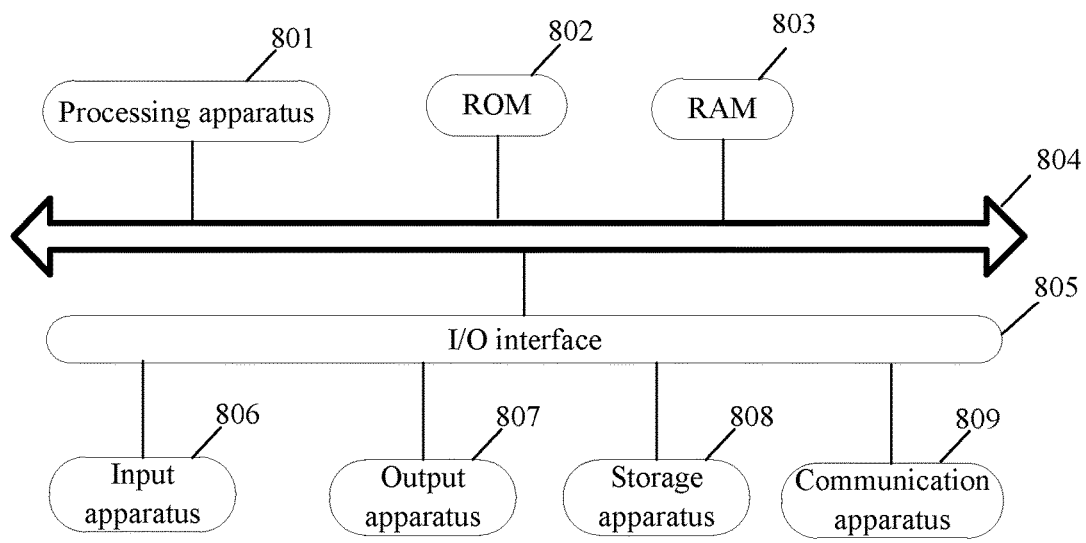
FIG. 8 is a schematic structural diagram of hardware of an electronic device provided by an embodiment of the present disclosure.

Referring to FIG. 8, it shows a schematic structural diagram of an electronic device suitable for implementing the embodiment of the present disclosure. As shown in FIG. 8, the electronic device may include a processing apparatus (such as a central processing unit, a graphics processor, etc.) 801, which may perform various appropriate actions according to a program stored in a read only memory (ROM) 802 or a program loaded into a random access memory (RAM) 803 from a storage apparatus 808. In the RAM 803, various programs and data required for the operation of the electronic device are also stored. The processing apparatus 801, the ROM 802, and the RAM 803 are connected to each other through a bus 804. An input/output (I/O) interface 805 is also connected to the bus 804.

Usually, the following apparatuses can be connected to the I/O interface 805: an input apparatus 806 including, such as, a touch screen, a touchpad, a keyboard, a mouse, a camera, a microphone, an accelerometer, a gyroscope, etc.; an output apparatus 807 including, such as, a liquid crystal display (LCD), a speaker, a vibrator, etc.; the storage apparatus 808 including, such as, a magnetic tape, a hard disk, etc.; and a communication apparatus 809. The communication apparatus 809 may allow the electronic device to perform wireless or wired communication with other devices to exchange data. Although FIG. 8 shows an electronic device having various apparatuses, it should be understood that it is not required to implement or have all of the apparatuses illustrated. More or fewer apparatuses may alternatively be implemented or provided.

In particular, according to the embodiments of the present disclosure, the process described above with reference to the flow chart can be implemented as a computer software program. For example, an embodiment of the present disclosure includes a computer program product including a computer program carried on a computer readable medium, where the computer program contains program codes for executing the method shown in the flow chart. In such embodiment, the computer program can be downloaded and installed from a network through the communication apparatus 809, or installed from the storage apparatus 808 or installed from the ROM 802. When the computer program is executed by the processing apparatus 801, the above functions defined in the methods of the embodiments of the present disclosure are executed. The embodiments of the present disclosure also include a computer program which, when executed by a processor, executes the above functions defined in the method of the embodiments of the present disclosure.

It should be noted that the above computer readable medium in the present disclosure can be a computer readable signal medium or a computer readable storage medium or a combination of the two. The computer readable storage medium can be, for example, but not limited to, an electrical, a magnetic, an optical, an electromagnetic, an infrared, or a semiconductor system, apparatus, or device, or any combination of the above. More specific examples of computer-readable storage media may include, but are not limited to, electrical connections with one or more wires, portable computer disks, hard disks, random access memories (RAM), read only memories (ROM), erasable programmable read-only memories (EPROM), flash memories, optical fibers, compact disk-read only memories (CD-ROM), optical storage devices, and magnetic storage devices, or any suitable combination of the above. In the present disclosure, the computer readable storage medium can be any tangible medium containing or storing a program, where the program can be used by or in connection with an instruction execution system, apparatus or device. And in the present disclosure, the computer readable signal medium may include a data signal propagated in baseband or as a part of a carrier wave, in which computer readable program codes are carried. This propagated data signal can adopt various manners, including but not limited to an electromagnetic signal, an optical signal or any suitable combination of the above. The computer readable signal medium can also be any computer readable medium other than a computer readable storage medium, and the computer readable signal medium can send, propagate or transmit a program for use by or in connection with an instruction execution system, apparatus or device. The program code contained on the computer readable medium can be transmitted by any suitable medium, including, but not limited to, an electric wire, an optical cable, radio frequency (RF), etc., or any suitable combination of the above.

The above computer readable medium may be contained in the above electronic device; or may exist separately instead of being assembled into the electronic device.

The above computer readable medium carries one or more programs, and the one or more programs, when executed by the electronic device, cause the electronic device to execute the methods shown in the above disclosed embodiments.

The computer program codes for executing the operations of the present disclosure can be written in one or more programming languages or a combination thereof, where the above programming languages include object-oriented programming languages such as Java, Smalltalk, C++, and also conventional procedural programming languages such as "C" language or similar programming languages. The program codes can be completely executed on the user computer, partially executed on the user computer, executed, as an independent software package, partially executed on the user computer and partially executed on a remote computer, or completely executed on a remote computer or a server. In case of involving a remote computer, the remote computer can be connected to the user computer through any kind of networks, including a local area network (LAN) or a wide area network (WAN), or can be connected to an external computer (for example, by using Internet service providers to connect through the Internet).

The flow charts and block diagrams in the drawings illustrate the architecture, functions and operations of possible implementations of systems, methods and computer program products according to various embodiments of the present disclosure. In this regard, each block in the flow charts or block diagrams may represent a module, a program segment, or a part of codes, where the module, the program segment, or the part of codes contains one or more executable instructions for implementing specified logical functions. It should also be noted that, in some alternative implementations, the functions indicated in the blocks may also occur in a different order than those indicated in the drawings. For example, two blocks shown one after the other can actually be executed in parallel substantially, or they may sometimes be executed in an opposite order, depending on functions involved. It should also be noted that each block in the block diagrams and/or flow charts, and combinations of blocks in the block diagrams and/or flow charts, can be implemented with a dedicated hardware-based system that performs specified functions or operations, or can be implemented with combinations of dedicated hardware and computer instructions.

An involved unit described in the embodiments of the present disclosure can be implemented by software or hardware. Where a name of the unit does not constitute a limitation on the unit itself in some cases. For example, a first acquiring unit can also be described as "a unit for acquiring at least two Internet protocol addresses".

The above functions described herein may be performed, at least in part, by one or more hardware logic components. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include, but is not limited to, an electronic, a magnetic, an optical, an electromagnetic, an infrared, or a semiconductor system, apparatus, or device, or any suitable combination of the above contents. More specific examples of the machine readable medium may include an electrical connection based on one or more wires, a portable computer disk, a hard disk, a random access memory (RAM), a read only memory (ROM), an erasable programmable read only memory (EPROM), a flash memory, an optical fiber, a portable compact disc read only memory (CD-ROM), an optical storage device, a magnetic storage device, or any suitable combination of the above contents.

An embodiment of the present disclosure provides a computer program product, including a computer program, which is characterized in that when executed by a processor, the computer program realizes the video processing method as described in the first aspect above.

In a first aspect, an embodiment of the present disclosure provides a video processing method, including:
  playing an audio in a process of capturing a video;
  playing a first part of the audio at a changing speed according to a first speed change mode in response to recognizing that a target object presents a target state in a captured video image; where the first part of the audio represents an unplayed part of the audio when it is recognized that the target object presents the target state in the captured video image;
  obtaining a target video according to the captured video image and the audio;
  playing, in the target video, a video image captured before the target object presents the target state at a constant speed, and playing, in the target video, a video image captured after the target object presents the target state at a changing speed according to a second speed change mode, where the audio is played at a constant speed; and
  where a speed change direction of the first speed change mode is opposite from a speed change direction of the second speed change mode and a changing speed of the first speed change mode is the same as a changing speed of the second speed change mode.

According to one or more embodiments of the present disclosure, the target state has a mapping relationship with the first speed change mode;
playing the unplayed part of the audio at the changing speed according to the first speed change mode in response to recognizing that the target object presents the target state in the captured video image includes:
  determining the first speed change mode having the mapping relationship with the target state in response to recognizing that the target object presents the target state in the captured video image; and
  playing the first part of the audio at a changing speed according to the first speed change mode.

According to one or more embodiments of the present disclosure, the target state includes a state in which the target object presents a target action and/or a preset object is presented in the target object.

According to one or more embodiments of the present disclosure, the obtaining the target video according to the captured video image and the audio includes:
  recording the captured video image at a constant speed to obtain a first video;
  dividing the first video into a first video segment and a second video segment; the first video segment represents a segment of the first video before the target object presents the target state; and the second video segment represents a segment of the second video after the target object presents the target state;

performing speed change processing on the second video segment according to the second speed change mode to obtain a third video segment; and synthesizing the audio in a spliced video of the first video segment and the third video segment to obtain the target video.

According to one or more embodiments of the present disclosure, the obtaining the target video according to the captured video image and the audio includes:

recording a played video image and a played audio to obtain a second video in the process of capturing a video; and in the second video, playing the audio before the target object presents the target state at a constant speed, and playing the audio after the target object presents the target state at a changing speed according to a first speed change mode, where the captured video image is played at a constant speed;

dividing the second video into a third video segment and a fourth video segment; where the third video segment represents a segment of the second video before the target object presents the target state; and the fourth video segment represents a segment of the second video after the target object presents the target state; and performing speed change processing on the fourth video segment according to the second speed change mode to obtain a fifth video segment; and splicing the third video segment and the fifth video segment to obtain the target video.

According to one or more embodiments of the present disclosure, the second speed change mode is determined in response to a setting operation of a user, and the first speed change mode is determined based on the second speed change mode.

In a second aspect, an embodiment of the present disclosure provides a video processing apparatus, where the apparatus includes:

a capturing module, configured to play an audio in a process of capturing a video;

a processing module, configured to play a first part of the audio at a changing speed according to a first speed change mode in response to recognizing that a target object presents a target state in a captured video image; where the first part of the audio represents an unplayed part of the audio when it is recognized that the target object presents the target state in the captured video image;

the processing module is further configured to obtain a target video according to the captured video image and the audio; and a playing module, configured to play, in the target video, a video image captured before the target object presents the target state at a constant speed, and play, in the target video, a video image captured after the target object presents the target state at a changing speed according to a second speed change mode, where the audio is played at a constant speed;

where a speed change direction of the first speed change mode is opposite from a speed change direction of the second speed change mode and a changing speed of the first speed change mode is the same as a changing speed of the second speed change mode.

According to one or more embodiments of the present disclosure, the target state has a mapping relationship with the first speed change mode; the processing module is specifically configured to: determine the first speed change mode having the mapping relationship with the target state in response to recognizing that the target object presents the target state in the captured video image; and play the first part of the audio at a changing speed according to the first speed change mode.

According to one or more embodiments of the present disclosure, the target state includes a state in which the target object presents a target action and/or a preset object is presented in the target object.

According to one or more embodiments of the present disclosure, the processing module is specifically configured to: record the captured video image at a constant speed to obtain a first video; divide the first video into a first video segment and a second video segment; the first video segment represents a segment of the first video before the target object presents the target state; and the second video segment represents a segment of the second video after the target object presents the target state; perform speed change processing on the second video segment according to the second speed change mode to obtain a third video segment; and synthesize the audio in a spliced video of the first video segment and the third video segment to obtain the target video.

According to one or more embodiments of the present disclosure, the processing module is further specifically configured to: record a played video image and a played audio to obtain a second video in the process of capturing a video; and in the second video, play the audio before the target object presents the target state at a constant speed, and play the audio after the target object presents the target state at a changing speed according to a first speed change mode, where the captured video image is played at a constant speed; divide the second video into a third video segment and a fourth video segment; where the third video segment represents a segment of the second video before the target object presents the target state; and the fourth video segment represents a segment of the second video after the target object presents the target state; and perform speed change processing on the fourth video segment according to the second speed change mode to obtain a fifth video segment; and splice the third video segment and the fifth video segment to obtain the target video.

According to one or more embodiments of the present disclosure, the second speed change mode is determined in response to a setting operation of a user, and the first speed change mode is determined based on the second speed change mode.

In a third aspect, an embodiment of the present disclosure provides an electronic device, including: at least one processor and a memory;

the memory stores computer-executed instructions;

where the at least one processor executes the computer-executed instructions stored in the memory to cause the at least one processor to execute the video processing method as described in any one of the above first aspect.

In a fourth aspect, an embodiment of the present disclosure provides a computer readable storage medium storing computer-executed instructions which, when executed by a processor, implement the video processing method as described in any one of the above first aspect.

In a fifth aspect, an embodiment of the present disclosure provides a computer program product including a computer program which, when executed by a processor, implements the video processing method as described in any one of the above first aspect.

In a sixth aspect, an embodiment of the present disclosure provides a computer program which, when executed by a processor, implements the video processing method as described in any one of the above first aspect.

The above description is only a description of preferred embodiments of the present disclosure and applied technical principles. It should be understood by those skilled in the art that the disclosure scope involved in the present disclosure is not limited to the technical solution formed by the specific combination of the above technical features, but also covers other technical solutions formed by any combination of the above technical features or equivalent features thereof without departing from the above disclosure concept. For example, the technical solution formed by replacing the above features with the technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiment may also be implemented in a single embodiment in combination. On the contrary, various features described in the context of a single embodiment can also be implemented in multiple embodiments individually or in any suitable sub-combination.

Although the subject matter has been described in a language specific to structural features and/or logical acts of methods, it should be understood that the subject matter defined in the appended claims is not necessarily limited to the specific features or acts described above. On the contrary, the specific features and actions described above are merely exemplary forms for implementing the claims.

What is claimed is:

1. A video processing method, wherein the method comprises:
    playing an audio in a process of capturing a video;
    playing a first part of the audio at a changing speed according to a first speed change mode in response to recognizing that a target object presents a target state in a captured video image; wherein the first part of the audio represents an unplayed part of the audio when it is recognized that the target object presents the target state in the captured video image;
    obtaining a target video according to the captured video image and the audio; and
    playing, in the target video, a video image captured before the target object presents the target state at a constant speed, and playing, in the target video, a video image captured after the target object presents the target state at a changing speed according to a second speed change mode, wherein the audio is played at a constant speed; and
    wherein a speed change direction of the first speed change mode is opposite from a speed change direction of the second speed change mode and the changing speed of the first speed change mode is the same as the changing speed of the second speed change mode;
    wherein a captured original sound is not recorded in the process of capturing the video and the target state comprises a state in which the target object presents a target action.

2. The method according to claim 1, wherein the target state has a mapping relationship with the first speed change mode;
    playing the unplayed part of the audio at the changing speed according to the first speed change mode in response to recognizing that the target object presents the target state in the captured video image comprises:
    determining the first speed change mode having the mapping relationship with the target state in response to recognizing that the target object presents the target state in the captured video image; and
    playing the first part of the audio at the changing speed according to the first speed change mode.

3. The method according to claim 1, wherein the target state further comprises a state in which a preset object is presented in the target object, and the target state comprises at least one target action of smiling, blinking, raising a hand and lifting a leg presented by the target object, and the preset object comprises at least one of clothes, cars and buildings.

4. The method according to claim 1, wherein the obtaining the target video according to the captured video image and the audio comprises:
    recording the captured video image at a constant speed to obtain a first video;
    dividing the first video into a first video segment and a second video segment; the first video segment represents a segment of the first video before the target object presents the target state; and the second video segment represents a segment of the second video after the target object presents the target state;
    performing speed change processing on the second video segment according to the second speed change mode to obtain a third video segment; and
    synthesizing the audio in a spliced video of the first video segment and the third video segment to obtain the target video.

5. The method according to claim 1, wherein the obtaining the target video according to the captured video image and the audio comprises:
    recording a played video image and a played audio to obtain a second video in the process of capturing a video; and in the second video, playing the audio before the target object presents the target state at a constant speed, and playing the audio after the target object presents the target state at a changing speed according to the first speed change mode, wherein the captured video image is played at a constant speed;
    dividing the second video into a third video segment and a fourth video segment; wherein the third video segment represents a segment of the second video before the target object presents the target state; and the fourth video segment represents a segment of the second video after the target object presents the target state; and
    performing speed change processing on the fourth video segment according to the second speed change mode to obtain a fifth video segment; and splicing the third video segment and the fifth video segment to obtain the target video.

6. The method according to claim 1, wherein the second speed change mode is determined in response to a setting operation of a user, and the first speed change mode is determined based on the second speed change mode.

7. The method according to claim 1, wherein before the process of capturing the video, the method further comprises:

displaying a capturing interface and starting a capturing function, comprising:
  displaying the capturing interface for capturing the target object, wherein the capturing interface comprises a special effect editing button for supporting and controlling video speed change recording; and
  in response to a first triggering operation acting on the special effect editing button, upon receiving an instruction for instructing to perform a capturing operation on the capturing interface, performing a first capturing operation, and recognizing whether the target object presents the target state at the time of capturing the target object in the capturing interface.

8. The method according to claim 1, wherein the method further comprises:
  jumping to display a playing interface in response to a second triggering operation for indicating to end capturing, wherein the playing interface is used to play the target video; or, jumping to display the playing interface after a capturing time in a capturing interface is over; and
  playing the target video.

9. The method according to claim 8, wherein after a capturing function is turned on, the method further comprises:
  in response to the second triggering operation for instructing to end the capturing, resetting at least one of the following: the first speed change mode, the second speed change mode, a state of special effect editing effect, and a state of the capturing interface.

10. The method according to claim 8, wherein after jumping to display the playing interface, the method further comprises:
  controlling the playing interface to return to the capturing interface containing a captured target object in response to a first return triggering operation.

11. An electronic device, comprising:
  at least one processor; and
  a memory;
  wherein the memory stores computer-executed instructions; and
  the at least one processor executes the computer-executed instructions stored in the memory to cause the at least one processor to:
  play an audio in a process of capturing a video;
  play a first part of the audio at a changing speed according to a first speed change mode in response to recognizing that a target object presents a target state in a captured video image; wherein the first part of the audio represents an unplayed part of the audio when it is recognized that the target object presents the target state in the captured video image;
  obtain a target video according to the captured video image and the audio; and
  play, in the target video, a video image captured before the target object presents the target state at a constant speed, and play, in the target video, a video image captured after the target object presents the target state at a changing speed according to a second speed change mode, wherein the audio is played at a constant speed; and
  wherein a speed change direction of the first speed change mode is opposite from a speed change direction of the second speed change mode and the changing speed of the first speed change mode is the same as the changing speed of the second speed change mode;

wherein a captured original sound is not recorded in the process of capturing the video and the target state comprises a state in which the target object presents a target action.

12. The electronic device according to claim 11, wherein the at least one processor is configured to execute the computer-executed instructions in the memory to:
  determine the first speed change mode having a mapping relationship with the target state in response to recognizing that the target object presents the target state in the captured video image; and
  play the first part of the audio at the changing speed according to the first speed change mode.

13. The electronic device according to claim 11, wherein the target state further comprises a state in which a preset object is presented in the target object, and the target state comprises at least one target action of smiling, blinking, raising a hand and lifting a leg presented by the target object, and the preset object comprises at least one of clothes, cars and buildings.

14. The electronic device according to claim 11, wherein the at least one processor is configured to execute the computer-executed instructions in the memory to:
  record the captured video image at a constant speed to obtain a first video;
  divide the first video into a first video segment and a second video segment; the first video segment represents a segment of the first video before the target object presents the target state; and the second video segment represents a segment of the second video after the target object presents the target state;
  perform speed change processing on the second video segment according to the second speed change mode to obtain a third video segment; and
  synthesize the audio in a spliced video of the first video segment and the third video segment to obtain the target video.

15. The electronic device according to claim 11, wherein the at least one processor is configured to execute the computer-executed instructions in the memory to:
  record a played video image and a played audio to obtain a second video in the process of capturing a video; and
  in the second video, play the audio before the target object presents the target state at a constant speed, and play the audio after the target object presents the target state at the changing speed according to the first speed change mode, wherein the captured video image is played at a constant speed;
  divide the second video into a third video segment and a fourth video segment; wherein the third video segment represents a segment of the second video before the target object presents the target state; and the fourth video segment represents a segment of the second video after the target object presents the target state; and
  perform speed change processing on the fourth video segment according to the second speed change mode to obtain a fifth video segment; and splice the third video segment and the fifth video segment to obtain the target video.

16. The electronic device according to claim 11, wherein the second speed change mode is determined in response to a setting operation of a user, and the first speed change mode is determined based on the second speed change mode.

17. The electronic device according to claim 11, wherein the at least one processor is configured to execute the computer-executed instructions in the memory to:

display a capturing interface for capturing the target object, wherein the capturing interface comprises a special effect editing button for supporting and controlling video speed change recording; and perform a first capturing operation, and recognize whether the target object presents the target state at the time of capturing the target object in the capturing interface in response to a first triggering operation acting on the special effect editing button, upon receiving an instruction for instructing to perform a capturing operation on the capturing interface.

18. The electronic device according to claim 11, wherein the at least one processor is configured to execute the computer-executed instructions in the memory to:

jump to display a playing interface in response to a second triggering operation for indicating to end capturing, wherein the playing interface is used to play the target video; or, jump to display the playing interface after a capturing time in a capturing interface is over; and play the target video.

19. The electronic device according to claim 18, wherein after a capturing function is turned on, the at least one processor is configured to execute the computer-executed instructions in the memory to:

reset at least one of the following: the first speed change mode, the second speed change mode, a state of special effect editing effect, and a state of the capturing interface in response to the second triggering operation for instructing to end the capturing.

20. A non-transitory computer readable storage medium storing computer-executed instructions which, when executed by a processor, implement:

play an audio in a process of capturing a video;

play a first part of the audio at a changing speed according to a first speed change mode in response to recognizing that a target object presents a target state in a captured video image; wherein the first part of the audio represents an unplayed part of the audio when it is recognized that the target object presents the target state in the captured video image;

obtain a target video according to the captured video image and the audio; and play, in the target video, a video image captured before the target object presents the target state at a constant speed, and play, in the target video, a video image captured after the target object presents the target state at a changing speed according to a second speed change mode, wherein the audio is played at a constant speed; and wherein a speed change direction of the first speed change mode is opposite from a speed change direction of the second speed change mode and the changing speed of the first speed change mode is the same as the changing speed of the second speed change mode;

wherein a captured original sound is not recorded in the process of capturing the video and the target state comprises a state in which the target object presents a target action.

* * * * *